(12) United States Patent
Cordes et al.

(10) Patent No.: US 10,730,192 B2
(45) Date of Patent: *Aug. 4, 2020

(54) METHODS AND SYSTEMS FOR PROVIDING PROTECTION AGAINST HARMFUL MATERIAL

(71) Applicant: Intech Defense, LLC, Chantilly, VA (US)

(72) Inventors: Marc Cordes, Arlington, VA (US); Paul LaHaye, Arnold, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 16/195,467

(22) Filed: Nov. 19, 2018

(65) Prior Publication Data
US 2019/0084167 A1  Mar. 21, 2019

Related U.S. Application Data

(63) Continuation of application No. 13/421,256, filed on Mar. 15, 2012.

(60) Provisional application No. 61/453,520, filed on Mar. 16, 2011.

(51) Int. Cl.
*B25J 21/02* (2006.01)
*B08B 7/00* (2006.01)

(52) U.S. Cl.
CPC ............. *B25J 21/02* (2013.01); *B08B 7/0021* (2013.01); *B08B 7/0092* (2013.01)

(58) Field of Classification Search
CPC .......... B25J 21/02; B08B 15/026; G21F 7/04; F24F 3/161; B01L 1/04

USPC ............... 312/1, 257.1, 3, 4, 5, 6, 209, 114; 55/385.2; 454/56, 57, 187; 600/21, 22; 422/565; 73/37, 40
See application file for complete search history.

(56) References Cited

U.S. PATENT DOCUMENTS

| | | | | | |
|---|---|---|---|---|---|
| 2,862,307 | A | * | 12/1958 | Bloomer | B25J 21/02 312/1 |
| 4,059,903 | A | * | 11/1977 | Piet | A61C 19/007 312/1 |
| 4,089,571 | A | * | 5/1978 | Landy | A61G 10/005 220/804 |
| 4,108,509 | A | * | 8/1978 | Piet | A61C 19/007 312/1 |
| 4,111,753 | A | * | 9/1978 | Folsom | B01L 1/00 435/3 |
| 4,190,172 | A | * | 2/1980 | Box | B65D 85/305 206/511 |

(Continued)

*Primary Examiner* — James O Hansen
(74) *Attorney, Agent, or Firm* — Capitol Patent & Trademark Law Firm, PLLC

(57) ABSTRACT

A glove box for handling harmful material is formed to be lightweight and modular in design, allowing for use in the field and various remote locations where a full laboratory is not available. The tank portion of the glove box is formed of a rigid, lightweight plastic and includes a number of standard-sized passageways for connecting other components (intake filter, exhaust filter, input/output containers, gasketed gloves, etc), allowing for modularity in its configuration. The top portion of the glove box may include a transparent window for viewing the material within the glove box. Filter components utilize HEPA filter elements and a separate, portable power supply is used to control a vacuum fan included in an exhaust filter. The power supply can also be used to perform diagnostic tests on the glove and may include a battery back-up.

15 Claims, 15 Drawing Sheets

(56) References Cited

U.S. PATENT DOCUMENTS

| | | | | |
|---|---|---|---|---|
| 4,295,692 A * | 10/1981 | Jenkins | | A47L 15/4246 |
| | | | | 134/200 |
| 4,697,854 A * | 10/1987 | Lunsford | | B25J 21/02 |
| | | | | 220/4.21 |
| 5,441,708 A * | 8/1995 | Diccianni | | B01L 1/04 |
| | | | | 312/1 |
| 5,730,765 A * | 3/1998 | Henry | | B01L 1/02 |
| | | | | 96/420 |
| 5,743,925 A * | 4/1998 | Bench | | B01D 45/16 |
| | | | | 55/336 |
| 6,235,072 B1 * | 5/2001 | Kopylov | | B01D 46/0023 |
| | | | | 55/338 |
| 6,241,328 B1 * | 6/2001 | Ziff | | A61C 13/12 |
| | | | | 312/1 |
| 6,910,445 B1 * | 6/2005 | Manthei | | A61D 7/04 |
| | | | | 119/420 |
| 7,077,486 B2 * | 7/2006 | Tattershall | | B01L 1/50 |
| | | | | 312/1 |
| 7,393,373 B1 * | 7/2008 | Krippner | | B29C 45/1701 |
| | | | | 128/205.26 |
| 2005/0011356 A1 * | 1/2005 | Laiti | | B01D 46/0023 |
| | | | | 95/273 |
| 2006/0131516 A1 * | 6/2006 | Roberts | | B25J 21/02 |
| | | | | 250/507.1 |
| 2007/0039294 A1 * | 2/2007 | Airey | | B01L 1/04 |
| | | | | 55/385.2 |
| 2008/0314774 A1 * | 12/2008 | Granadino | | G01M 3/226 |
| | | | | 206/216 |
| 2009/0001298 A1 * | 1/2009 | Deguchi | | G01J 1/02 |
| | | | | 250/573 |
| 2009/0127799 A1 * | 5/2009 | Alamond | | F02B 63/02 |
| | | | | 277/591 |
| 2010/0044372 A1 * | 2/2010 | Kournikakis | | B01L 1/04 |
| | | | | 220/9.2 |

\* cited by examiner

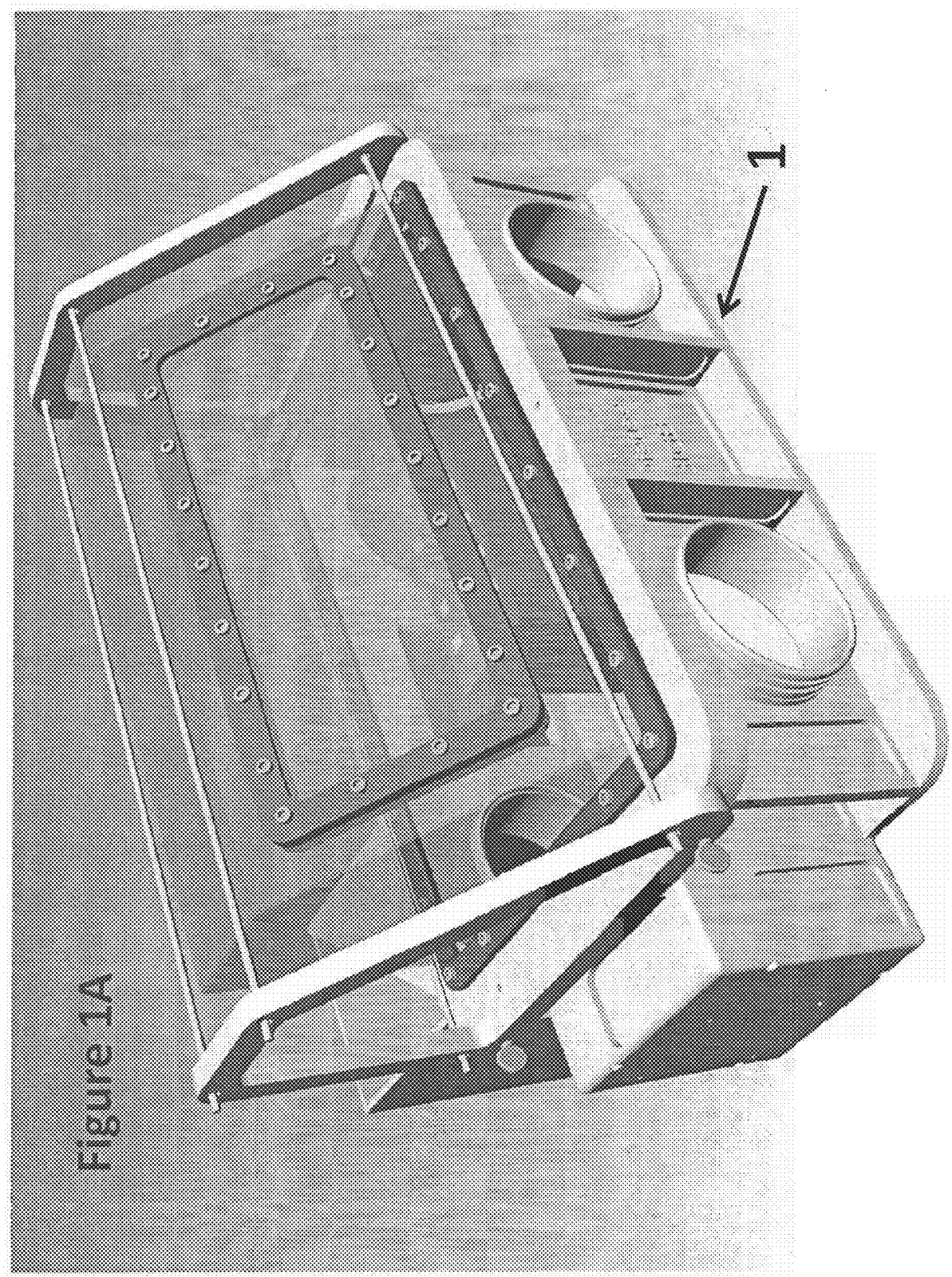

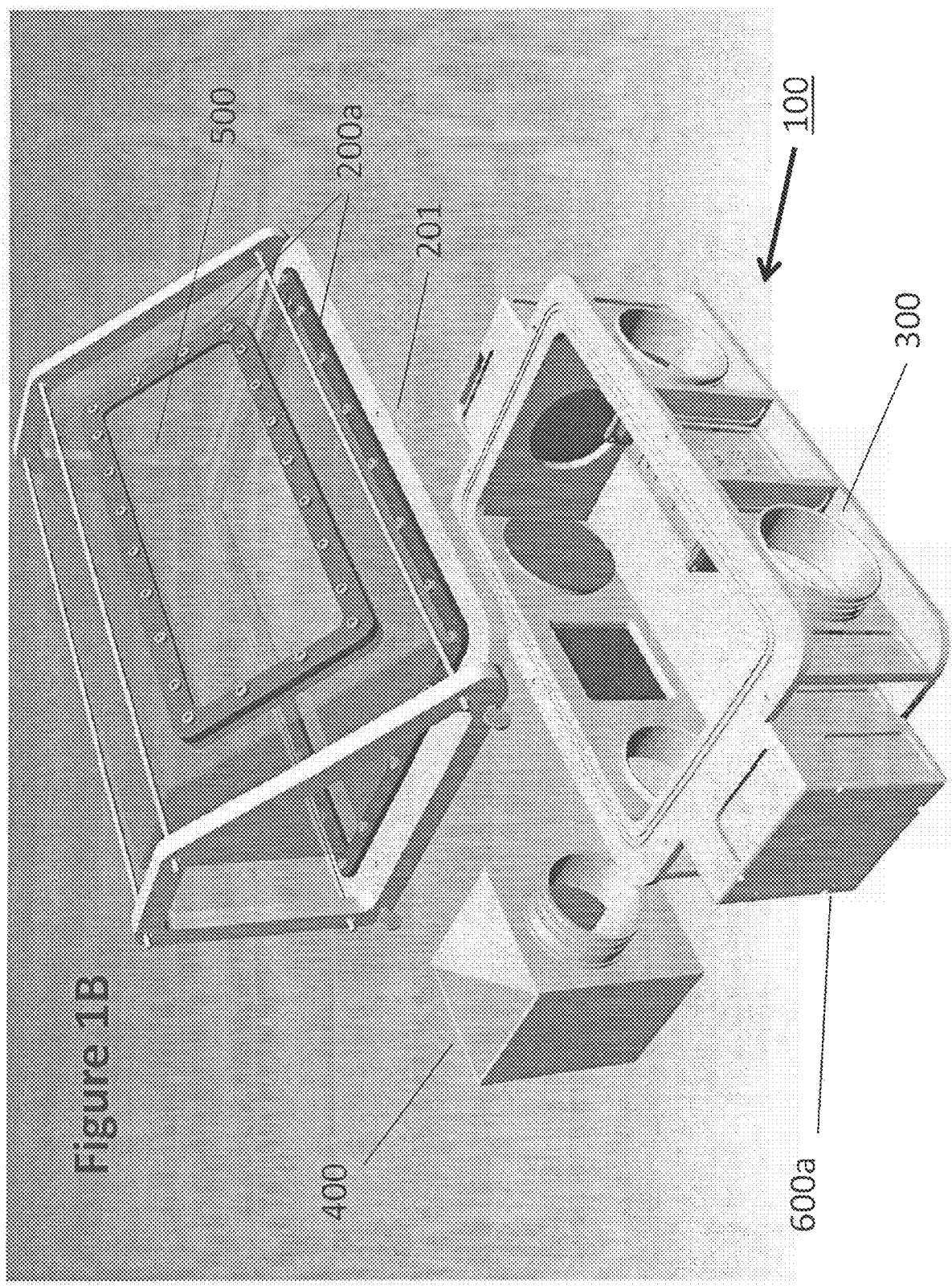

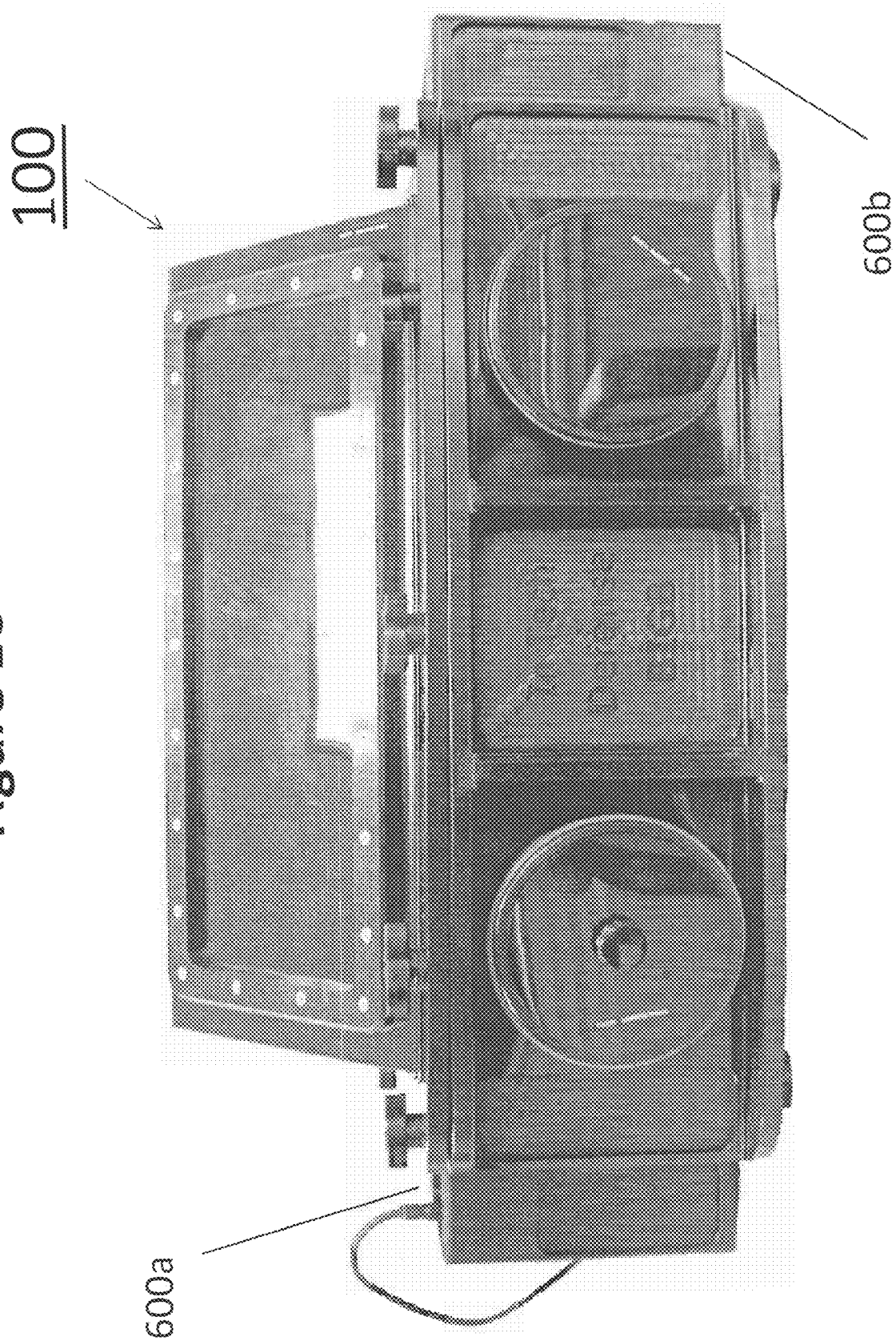

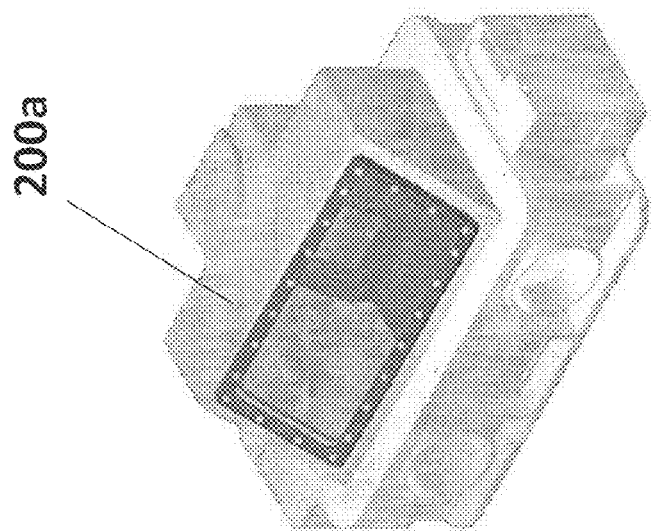
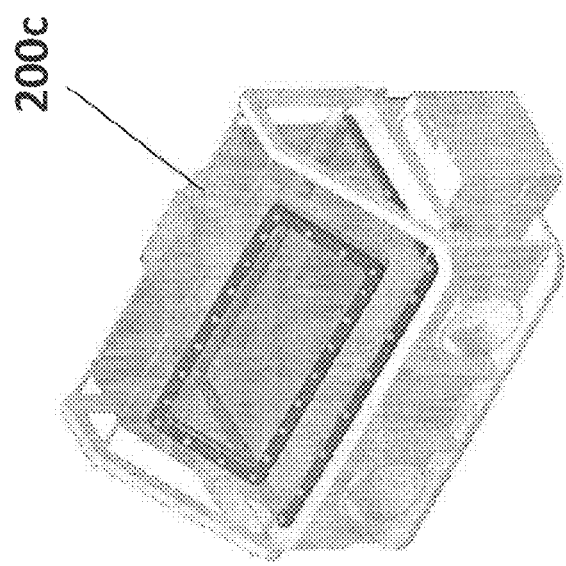
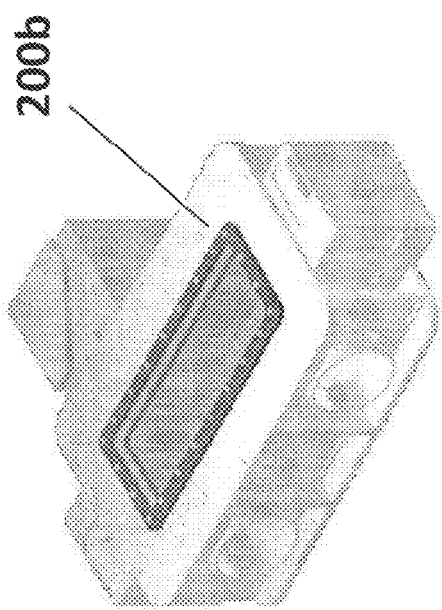
Figure 1E

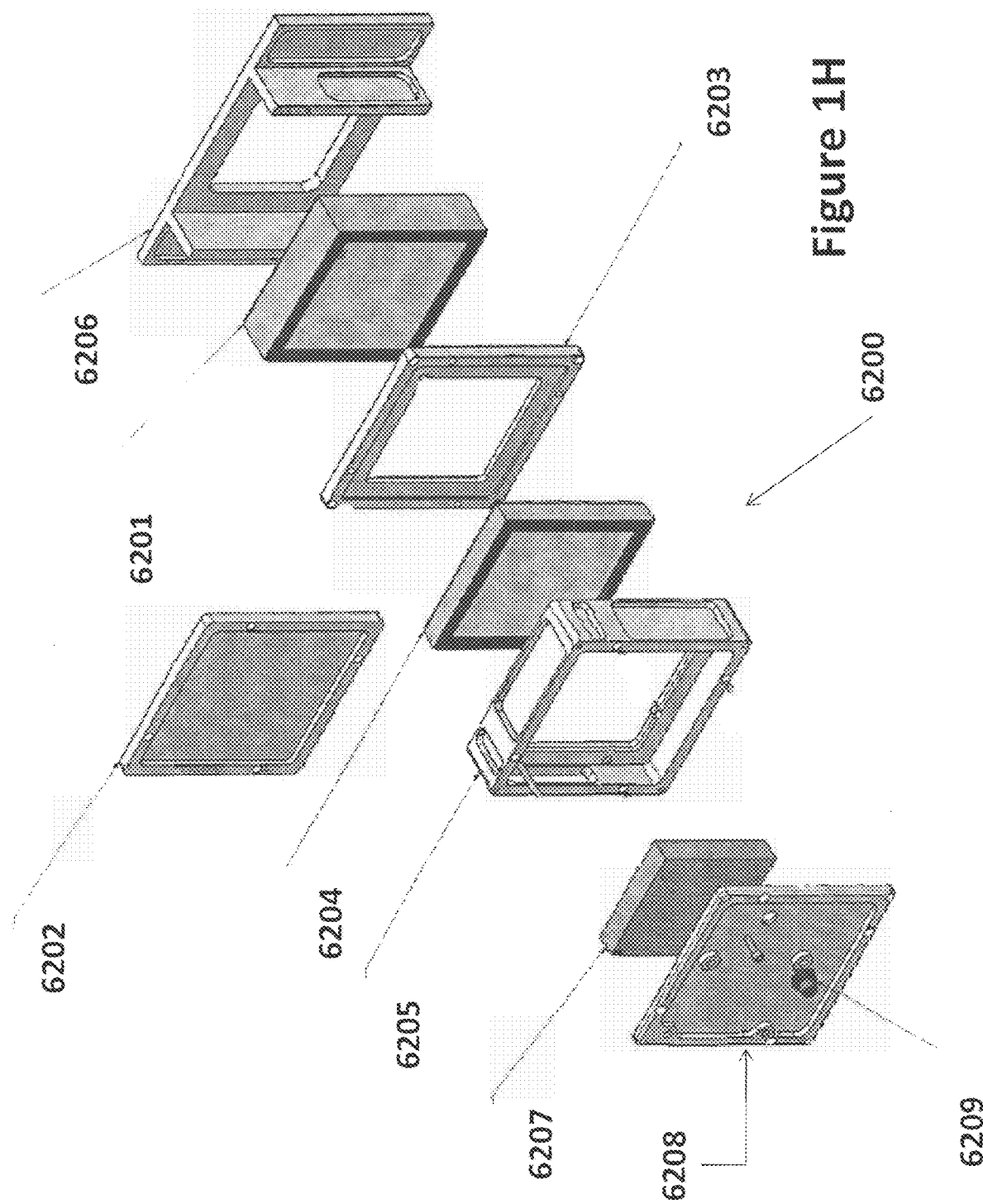

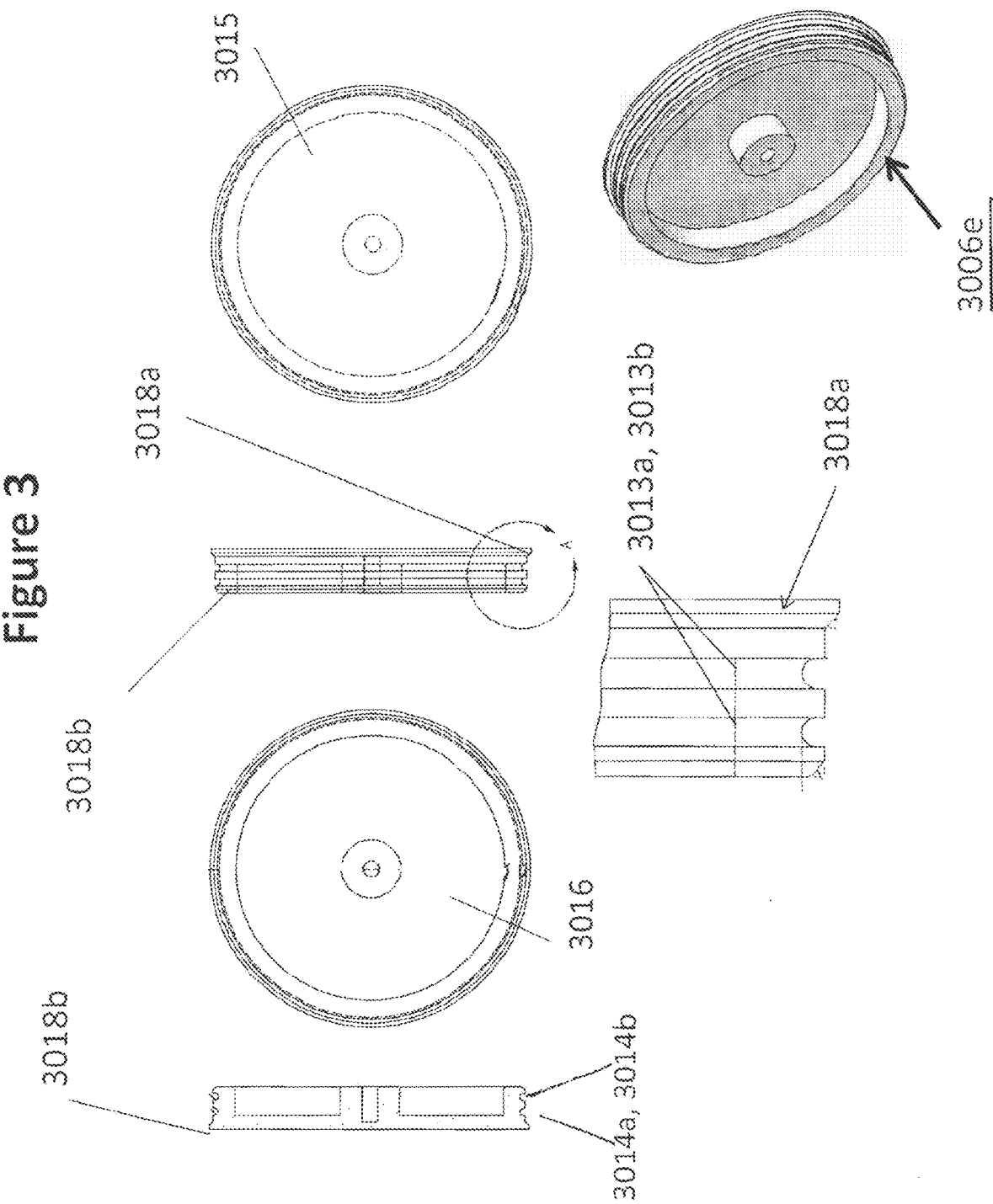

METHODS AND SYSTEMS FOR PROVIDING PROTECTION AGAINST HARMFUL MATERIAL

RELATED APPLICATIONS

This application is related to, and claims the benefit of priority from, U.S. Provisional Application No. 61/453,520 filed Mar. 16, 2011 (the "'520 Application"). This application is also a continuation application of, and claims the benefit of priority from, U.S. patent application Ser. No. 13/421,256 filed Mar. 15, 2012 (the "'256 Application"). This application incorporates by reference herein the entire disclosures of the '520 and '256 applications, including but not limited to, their text and drawings, as if such disclosures were set forth in full herein.

BACKGROUND OF THE INVENTION

So-called "glove boxes" are used to isolate bacteriological, chemical, radiological or other harmful agents or materials (collectively referred to as "harmful material'). Glove boxes are used in many industries to ensure that harmful material being tested or examined, for example, remains uncontaminated and that the individual or individuals responsible for completing the tests, examinations, etc., are not exposed to the harmful material.

Most conventional glove boxes are used in a laboratory or industrial/factory environment. Such glove boxes are not designed to be easily moved from one location to another. In fact, many are used within buildings that have been specially designed to work with conventional glove boxes in order to achieve the level of cleanliness/isolation and security required.

For example, so-called "class 3" glove boxes are almost always connected to external ventilation systems that use HEPA filters. ISO Standard 14644-1 designates airborne particulate cleanliness inside a clean air glove box through the use of "class" definitions. ISO class 3 is equivalent to 35 particles 0.5 μm or larger per cubic meter of air. ISO class 3 cleanliness is equivalent to class 1 air conditions as defined by Federal Standard 209E, which is one particle, 0.5 μm or larger per cubic foot of air per minute.

Besides class 3, glove boxes may also be ISO-categorized as class 1 or 2. The particular class assigned to a given glove box depends on its design (e.g., does it meet the safety requirements of a given class 1, 2, 3).

Typically, class 3 glove boxes are designed to protect its individual users/operators against harmful material, material which if released from the glove box or which otherwise escaped could endanger the operator and others around the operator. In general, to be categorized as a class 3 glove box, a particular glove box must meet the following design criteria: (a) must maintain a negative pressure to 0.5 inch of water; (b) must use a HEPA filter on any air intake; (c) must use two HEPA filters on any air exhaust (or one HEPA filter in line with an incinerator); and (d) must be air tight to prevent ingress and egress of small particulates.

As noted above, many class 3 glove boxes are used in a laboratory that is specially designed to allow for the safe operation of the glove box. In such a setting, a glove box is typically designed to operate using an external support system. Said another way, the surrounding laboratory is designed to interface with, and support, the operation of the glove box. For example, exhaust conduits to extract air from the glove box may be provided by the laboratory. The laboratory may also provide a source of stable electrical power.

For some scenarios, however, it is desirable to have a class 3 glove box which is portable while offering the same level of safety as static, non-movable laboratory glove boxes.

Because many laboratory glove boxes are quite heavy, they are not well adapted for mobile operations because their weight makes it highly improbable that they will be able to maintain their physical integrity and operational class 3 characteristics when transported, not to mention the difficulty in actually transporting such a glove box and its associated exhaust and power systems.

To date, while several class 3 glove boxes are purported to be "portable" they are not because: (a) they do not meet class 3 requirements; (b) their weight exceeds 100 lbs, making it practically improbable for a single individual to carry or move such a glove box; (c) they are not ruggedized, e.g., capable of maintaining class 3 operating requirements while deployed in rough environments.

Still other, lightweight and inexpensive glove boxes presently promoted as class 3, portable glove boxes do not meet the required performance or operating characteristics such as, for example, the required HEPA filters, air pressure limitations, or the like.

To be portable, a class 3 glove box should weigh less than 100 lbs in total, be constructed to withstand rugged environments, be operable without the need to rely on laboratory supplied power or auxiliary equipment (e.g., to create a vacuum within the glove box, erected quickly from a transport case).

Accordingly, it is desirable to provide for methods and systems, such as a class 3 glove box, that provide the same degree or higher protection against harmful materials as conventional class 3 glove boxes, but which are practically portable.

SUMMARY OF THE INVENTION

The needs remaining in the prior art are addressed by the present invention, which relates to a glove box for handling harmful material which is formed of lightweight material (i.e., rigid plastics) and is modular in design, allowing for use in the field and various remote locations where a full laboratory is not available. The tank portion of the glove box is formed of a rigid, lightweight plastic and includes a number of standard-sized passageways for connecting other components (intake filter, exhaust filter, input/output containers, gasketed gloves, etc), allowing for modularity in its configuration and the capability of "switching out" various components in the field. The top portion of the glove box may include a transparent window for viewing the material within the glove box. Filter components utilize HEPA filter elements and a separate, portable power supply is used to control a vacuum fan included in an exhaust filter cartridge assembly. The power supply can also be used to perform diagnostic tests on the glove and may include a battery back-up.

In one embodiment, the modular and portable glove box of the present invention comprises a top component, a tank component formed of a rigid, high density and lightweight plastic and comprising an upper edge removably attached to the top component, a floor and a plurality of vertical walls, the vertical walls including a plurality of standard-sized passageways for removable connection to other components, with all unused passageways covered with a blank connector to maintain the airtight integrity of the glove box, at least one filter component removably attached to a standard-sized passageway of a tank vertical wall for filtering air associated with the glove box and an input/output component removably attached to a standard-sized passageway of a tank vertical sidewall for introducing harmful material to, or extracting harmful material from, the glove box.

In another embodiment, the present invention is directed to a modular and portable glove box as described above and a portable power control subsystem for use with the glove box to control the air flow and pressure within the glovebox.

Other and further embodiments of the present invention will become apparent during the course of the following discussion and by reference to the accompanying drawings.

BRIEF DESCRIPTION OF THE DRAWINGS

FIG. 1A depicts an exemplary embodiment of a glove box designed in accordance with the present invention.

FIG. 1B depicts another exemplary embodiment of a glove box designed in accordance with the present invention highlighting major structural components of such a glove box.

FIG. 1C depicts another exemplary embodiment of a glove box designed in accordance with the present invention showing reversible intake and exhaust sections on sides of the glove box.

FIG. 1E depicts examples of a top section of a glove box according embodiments of the invention.

FIG. 1H depicts an alternative exploded view of a filtering arrangement which may form part of an exhaust section according to an embodiment of the invention.

FIG. 3 depicts exemplary embodiments of insert portions of a glove box in accordance with the present invention.

DETAILED DESCRIPTION OF EXEMPLARY EMBODIMENTS OF THE INVENTION

Figure 1D:
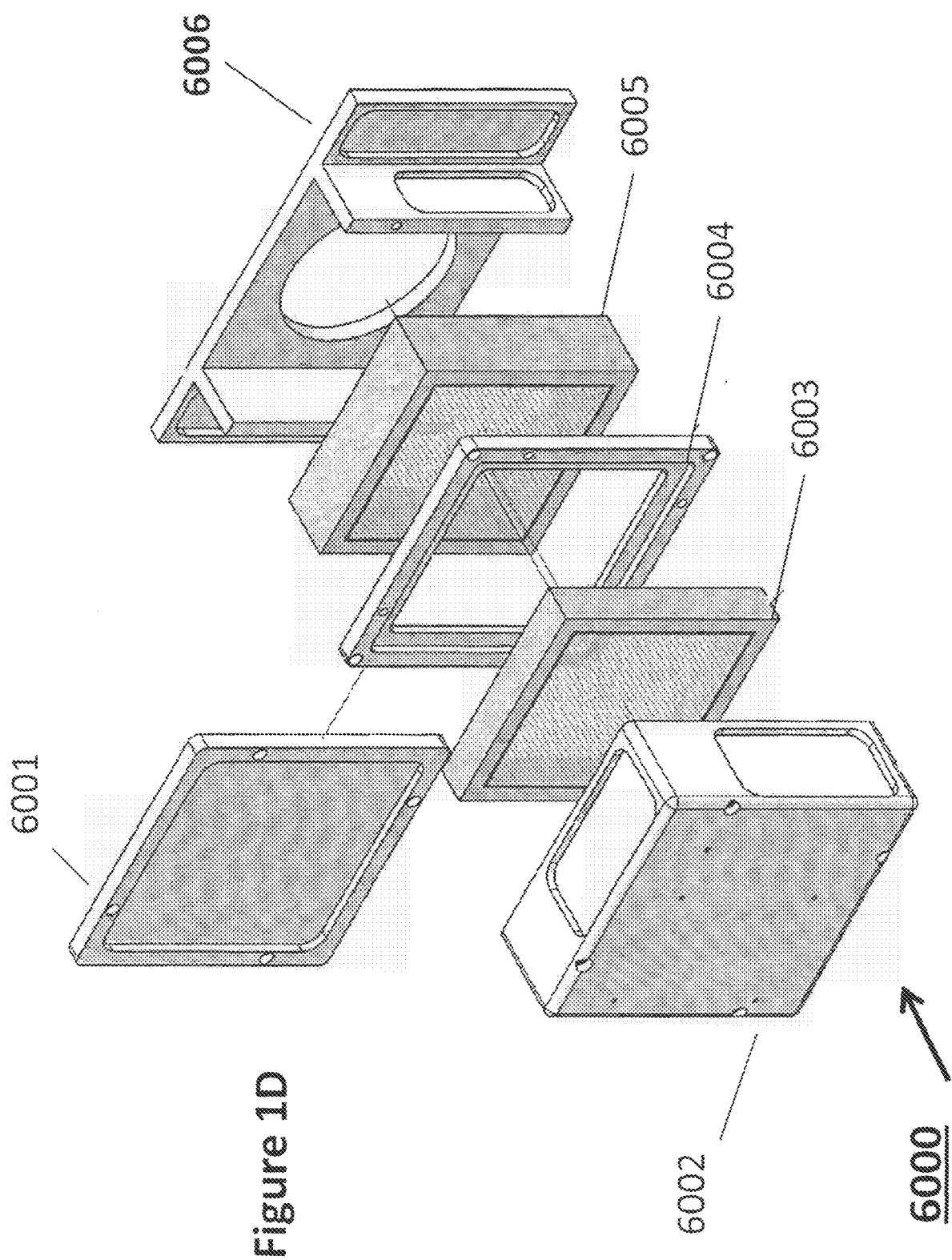
FIG. 1D depicts a simplified exploded view of a filtering arrangement which may form part of an intake or exhaust section according an embodiment of the invention.

Referring to FIG. 1A there is shown an exemplary embodiment of a glove box 1 designed in accordance with the present invention. It should be noted that while only a few of the features of the glove box 1 shown in FIG. 1A will be discussed herein, the scope of the present invention includes all of the features shown in FIG. 1A (as well as the other Figures).

Before discussing the elements of the glove box 1, it should be noted that in accordance with the present invention novel glove boxes are provided that meet one or more of the following criteria: (i) lightweight (e.g., 100 lbs or less); (ii) made from ruggedized material (e.g., to be more rugged than glove boxes made for fixed installations such as laboratories); (iii) designed to be transported and erected in the field and to maintain class 3 operating characteristics in challenging environments; (iv) includes an integrated glove box and power supply; (v) provides in-field modularity (e.g., can be reconfigured between, and during, specific uses to achieve needed functionality); and (vi) modular design (e.g., component size and shape, number of components, etc., making up glove box may be modified easily to adapt to different requirements).

The modularity of the novel glove boxes provided by the present invention may be demonstrated by referring to FIG. 1B. As shown, the glove box 100 is shown in a simplified "exploded" view as comprising: a top section 200a ("top"), tank section 300 ("tank"), input/output insert section 400 and filtering arrangement 600a. In accordance with the present invention the shape of the top 200a may take many forms, including the five sided one shown in FIG. 1B. For example, referring to FIG. 1E there are shown exemplary tops m accordance with the present invention. Top 200a (as also shown m FIG. 1B), a flat top 200b and a variable dimension top 200c whose dimensions may be varied to enclose items to be studied (e.g., military shells) that may not fit if top 200a is used, are shown as just some of the examples of a top. Top 200c may be made from the same material as top 200a or may be made from a fabric, tent-like material, expandable material or a flexible plastic, at times able to form a bubble-like surface.

Referring back to FIG. 1B, top 200a may include a "see through" section 500 (sometimes referred to as a port) or may be provided without such a section. In accordance with embodiments of the invention, the see through section 500 may be made from glass, plexiglas, a polycarbonate or another suitable and analogous material. When provided with such a section 500 the operator is able to view material within the tank 300. Yet further, the top 200 made have a flat or "bubble-like" surface.

As shown m the embodiment of FIG. 1B, the tank 300 includes upper and lower edge surfaces that extend beyond its vertical side walls to, for example, provide protection and ease of transportation.

Figure 1F:
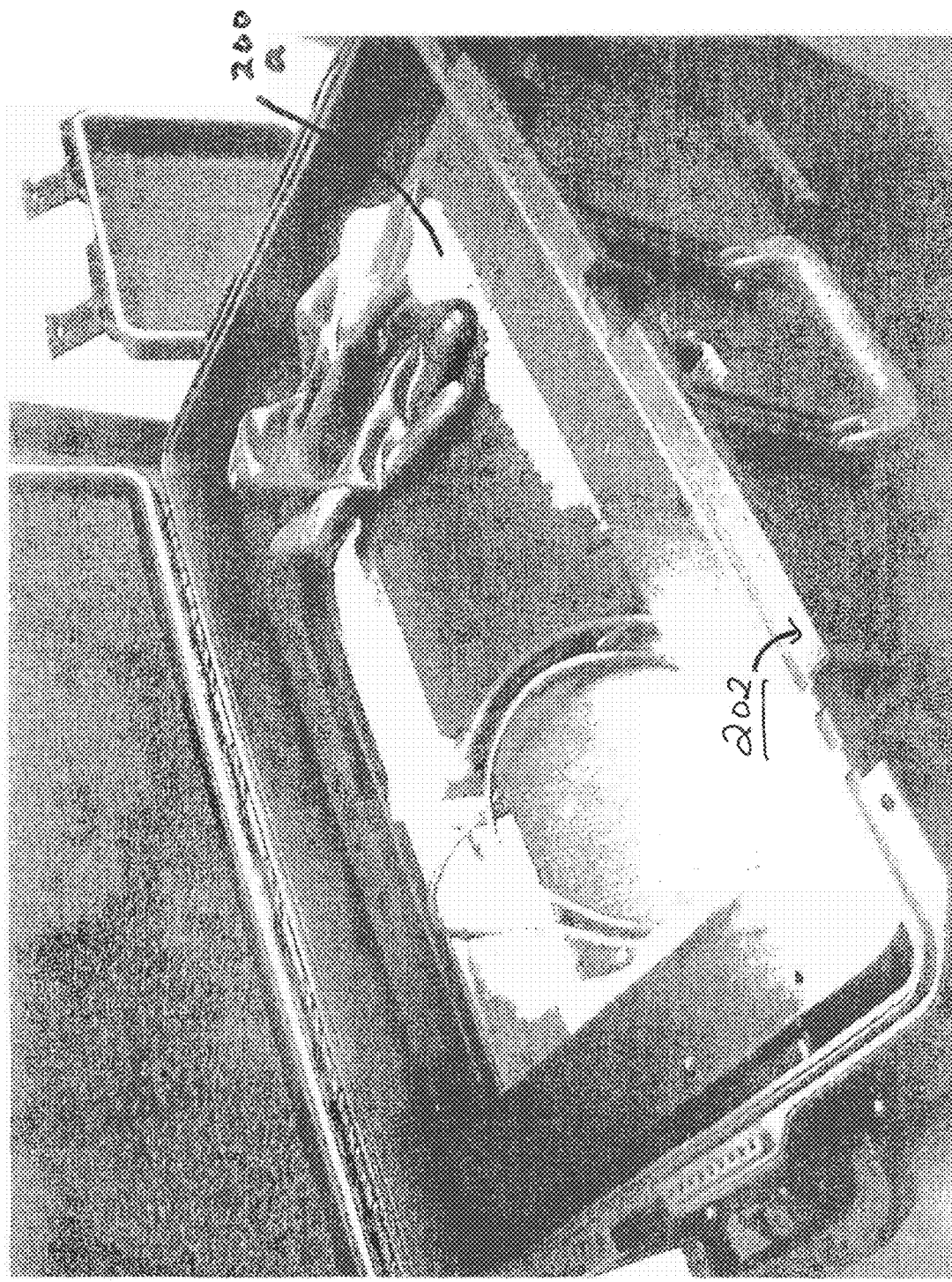
FIG. 1F depicts a top section of a glove box inverted and placed into the glove box, and the glove box inserted into a carrying case according an embodiment of the invention.

Referring to FIG. 1F there is depicted an exemplary top section 200a of a glove box shown inverted (upside down) and placed into a tank (not shown; underneath the top section 200a), with the combination inserted into a carrying case 202 according an embodiment of the invention. This allows the glove box system to be easily transported.

Each of the components shown in FIG. 1B are modular in nature meaning that each component may be modified in shape, form, and sometimes even function yet all components may still be combined into an integral glove box. The use of standard interfaces (i.e., inside and outside cylinder dimensions of ports around the perimeter of the glove box) allows for different components to be "swapped out" in the field (since all components will fit into the standard-sized openings around the perimeter of the glove box) New components and tools can continue to be developed that maintain this same standard interface, allowing for newer features to be deployed quickly.

Though not shown in FIG. 1B, it should be understood that gasketing material and/or a gasket may be placed around the top perimeter of the tank 300 and/or bottom perimeter of the top 200a such that when the top 200a and tank 300 are connected together a tight and reliable seal is created between them. The gaskets and/or gasketing material may be made of various material, such as rubber or another elastic polymer, an ethylene propylene diene monomer, or a synthetic rubber to give just a few examples.

Yet further, it should be understood that the top section 200a and tank 300 may be connected by various means, including the use of one or more screw and bolt combinations spaced appropriately around an edge 201 of the top section 200a, for example, that are connected via suitable holes in the tank and top section 200a, or by means of one or more cam lock (pressure activated) mechanisms that are also spaced appropriately around the top section 200a, for example (though the placement of the screw/bolt combinations or cam mechanisms may be varied provided, that the result is a tight and reliable seal between the top section 200a and tank 300).

Though the exemplary glove boxes shown in the figures and their subcomponents herein may be made using welds and welded plastic methods it should be understood that alternative glove boxes and their subcomponents may be made using molds and molding methods. In particular, if dimensions of one or more components is modified, a method employed by the present invention will use a software program to change all other related dimensions to form a proper, airtight unit. In this case, molding may be preferred method of manufacture. However, the use of welds may be preferred in situations where it is desired to increase the height of a box, for example, by welding additional vertical wall pieces to the original box configuration. In particular, the welding technique is preferred to maintain flexibility in easily changing tank dimensions for specific applications. A software-based arrangement is proposed for use in accordance with the present invention to assist in easily changing these dimensions to produce "special order" glove boxes. For example, when the design of a glove box needs to change in one or more dimensions (length, height and width), the software will reposition all components and determine the new dimensions for all portions of the glove box, allowing for the components to be manufactured as quickly as a standard tank It is estimated that the cost of redesign and manufacturing of a special order glove box will be less than the cost needed today for existing glove box manufacturers to re-engineer a completely new box. This advantage allows for a user to have a glove box perfectly adapted to his task/mission.

Referring to FIG. 1 C there is depicted another exemplary embodiment of a glove box designed in accordance with the present invention showing reversible filtering arrangements 600a, 600b on sides of the glove box. In one embodiment arrangement 600a may be an intake section and arrangement 600b may be an exhaust section for allowing air and other gases to enter and/or exit the glove box. In another embodiment arrangement 600a may be an exhaust section and arrangement 600b may be an intake section. In yet further embodiments of the invention the arrangements 600a, 600b may be positioned to function as an intake and/or exhaust section to accommodate both right-handed or left-handed individuals operating the glove box.

FIG. 1D depicts a simplified exploded view of a filtering arrangement 6000 which may form part of an intake or exhaust section according an embodiment of the invention. As shown an exemplary filtering arrangement 6000 includes a first filter or pre-filter 6003, a filter plate 6004, an optional filter lock 6001, a second filter 6005 and a filter holder 6002. The components 6001, 6003, 6004 and 6005 are typically housed within the holder 6002 and then connected to the side 6006 of a tank. Not shown in FIG. 1D are suitable gaskets that may be placed around the perimeter of each side of each component 6001, 6003, 6004 and 6005 such that when all of the components are connected together a tight and reliable seal is created between components. The gaskets may be made of various gasketing material, such as rubber or another elastic polymer, an ethylene propylene diene monomer (EPDM), or a synthetic rubber to give just a few examples.

In one embodiment of the invention, the first filter or pre-filter 6003 may be of one thickness while the second filter 6005 may be thicker in accordance with required sealing standards. When used together, the two subcomponents 6003 and 6005 form a double HEPA filter. In addition, the placement of the filters 6003, 6005 and other components shown in FIG. 1D may be adjusted depending on whether the arrangement 6000 is used as an intake or exhaust section (e.g., for intake functions air flows through the prefilter 6003 and then through filter 6005; for exhaust functions air flows through filter 6005, followed by prefilter 6003). In yet a further embodiment of the invention, the section 6000 may comprise an autoclave and a single filter instead of prefilter 6003 and filter 6005.

Figure 1G:
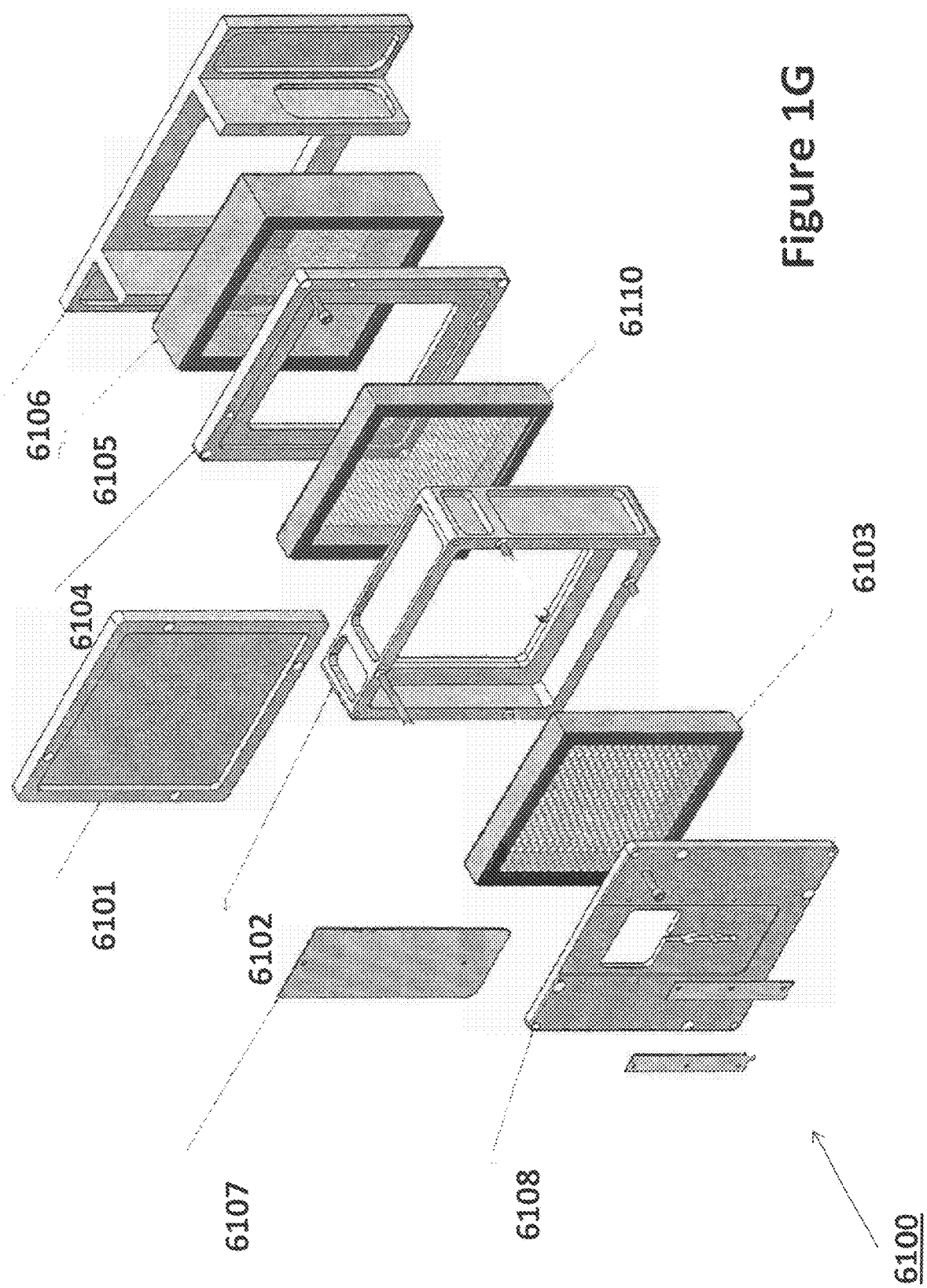
FIG. 1G depicts an alternative exploded view of a filtering arrangement which may form part of an intake section according to an embodiment of the invention.

FIG. 1G depicts a simplified exploded view of an alternative filtering arrangement 6100 which may form part of an intake section according an embodiment of the invention. As shown, an exemplary intake filtering arrangement 6100 includes a first filter or prefilter 6103, which is used to perform an initial, coarse filtering of the ambient environment. First prefilter 6103 is positioned on the exterior surface of a filter holder 6102 and is used to prevent the excessive accumulation of dirt within the remaining filter elements. A second prefilter 6110 is shown as positioned on the interior surface of filter holder 6102, where second prefilter 6110 is a somewhat "finer" filter that the initial, coarse prefilter 6103 and is used to protect the final (HEPA) filter from fine particulates and thus extend the life of the HEPA filter. A filter plate 6104 and an optional filter lock 6101 are included in similar fashion as the arrangement shown in FIG. 1D. In this particular three filter embodiment, a final HEPA filter 6105 is included as the third filtering element, where components 6110, 6104, 6101 and 6105 are typically housed within the holder 6102 and then connected to the side 6106 of a tank (not completely shown). An optional intake slide 6107 can be used in conjunction with a coverplate 6108 to control the operation of intake filter 6100. Not shown in FIG. 1G are suitable gaskets that may be placed around the perimeter of each side of each component such that when all of the components are connected together a tight and reliable seal is created between components. The gaskets may be made of various gasketing material, such as rubber or another elastic polymer, an ethylene propylene diene monomer (EPDM), or a synthetic rubber to give just a few examples.

FIG. 1H depicts a simplified exploded view of an alternative filtering arrangement 6200 which may form part of an exhaust section according an embodiment of the invention. As shown an exemplary exhaust filtering arrangement 6200 includes a first HEPA filter 6201 which is disposed adjacent to tank side 6206. An optional filter lock 6202 and a filter plate 6203 are disposed on the opposite side of first HEPA filter 620 I. A second HEPA filter 6204 is disposed beyond filter plate 6203, where filters 6201 and 6204, as well as lock 6202 and plate 6203 are all positioned within a filter holder 6205. In accordance with this embodiment, a vacuum fan 6207 is disposed on the opposite side of filter holder 6205 a 11d is energized to assist in drawing air from within the glove box and creating the desired airtight vacuum condition. A filter lid 6208 is used to cover fan 6207 and includes a power socket 6209 for providing the electrical input to fan 6207. Again, not shown in Figure IH are suitable gaskets that maybe placed around the perimeter of each side of each component such that when all of the components are connected together a tight and reliable seal is created between components. The gaskets may be made of various gasketing material, such as rubber or another elastic polymer, an ethylene propylene diene monomer (EPDM), or a synthetic rubber to give just a few examples.

Figure 2:
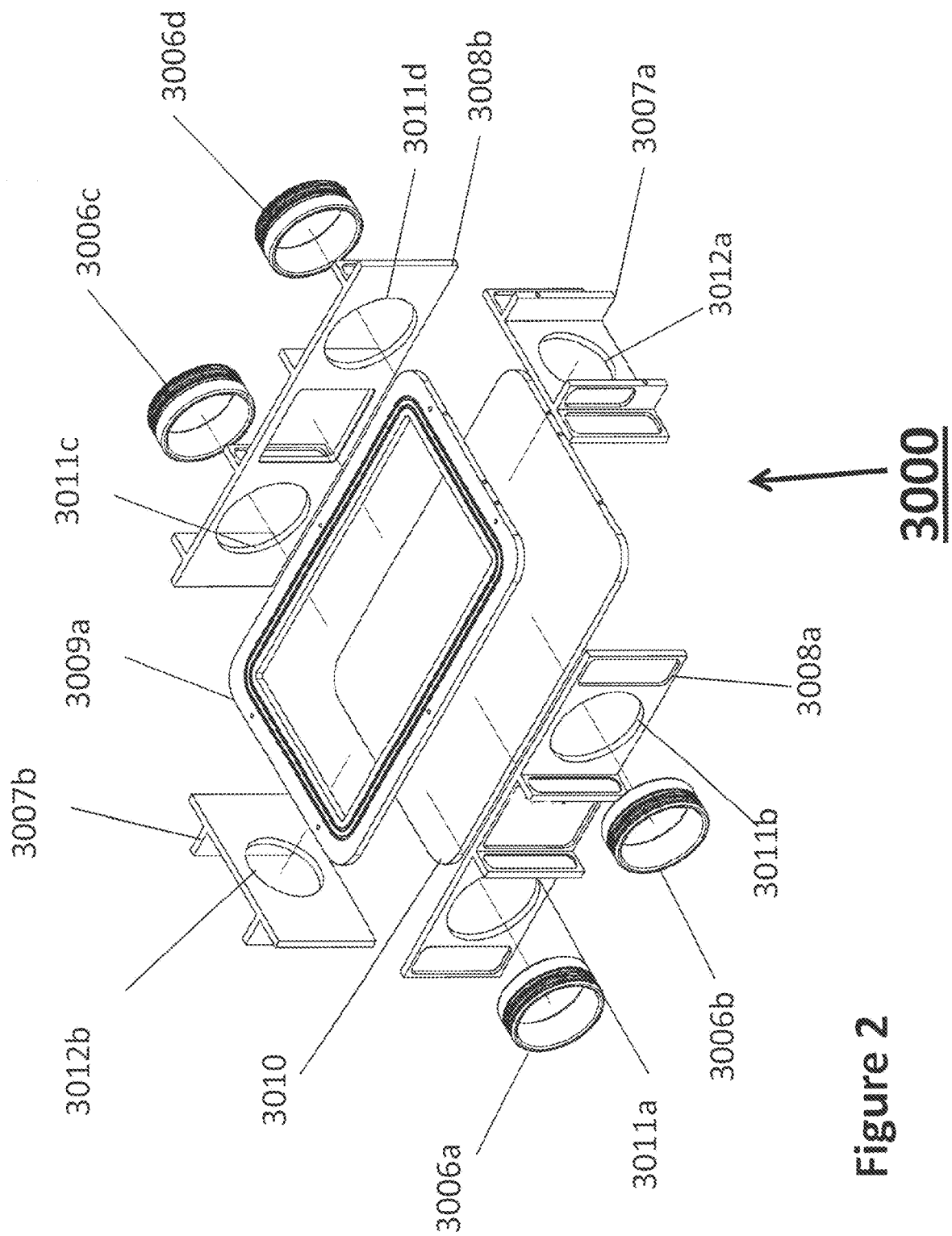
FIG. 2 depicts an exemplary embodiment of a tank portion of a glove box in accordance with the present invention.

Referring to FIG. 2 there is depicted an exemplary embodiment of a tank portion 3000 of a glove box in accordance with the present invention. As shown, the tank 3000 forms a rectangular tank, although the tank may take the form of any number of shapes, such as square or rounded to name just two examples. The tank 3000 may comprise a number of subcomponents such as one or more insert connectors 3006a-d, each insert being placed in a passageway 3011a-d formed in a backplate 3008a or b. Also shown are a pair of side plates 3007a and b that include formed passageways 3012a and b. Each of the side plates 3007a and b include passageways 3012a and b. Each of the passageways 3011a-d and 3012a and b may be used to connect input/output insert sections, like section 400 shown in FIG. 1B. In alternative embodiments of the invention section 400 may comprise a "pass through sock" or other arrangement for introducing tools and materials to the glove box and/or extracting tools and materials therefrom. In one case, a pass through sock can take the form of a circular tube made of flexible, plastic-like material that coupled to a connector 3006 and installed on the glove box via a passageway 3011 and used to introduce a tool into the glove box. A succession of clamps may be placed along the tube to block the tube into several separate chambers. As the tool is brought in (or, alternatively, an item is removed from the box), it is first isolated in a middle chamber between a pair of clamps. An oxidizing cartridge can be used at this point in the process to decontaminate the tool (or removed item). As an alternative to the sock, a conventional dunk tank can be used and connected to the glove box in a similar manner with a connector 3006, as attached to a passageway 3011, where again a tool (or removed item) is dumped into the bottom of the tank from inside or outside and is recovered after a few minutes either inside or outside where needed. The pass through sock and dunk tank are to be understood as only two of various types of additional components that can be easily and quickly attached to (or removed from) the inventive glove box during use, Though FIG. 1B only shows one insert section 400, it should be understood that multiple sections 400 may be made a part of an inventive glove box using the multiple insert connectors 3006a and passageways 3011a-d and 3012a and b.

The modularity advantages of the present invention also provides for various sections 400 and/or 600a, b to have different capabilities. For example, the design of a particular section 400 and/or 600a, b may be altered to change or adjust negative pressure and/or air flow characteristics as needed. Further, a particular section may be made to meet HEPA requirements (e.g., exhaust HEPA filter, supply HEPA filter) and/or ultra low particulate (ULPA) standards. Various, different functional sections 400 and/or 600a, b may be connected to accessory units to supply air, power or other resources to the tank 3000. Further, when a section 400, 600a, b functions as a filter the filters may comprise biological, chemical, carbon, radioactivity preventive filters, to name just a few examples.

In an alternative embodiment of the invention an "arms-length' glove made of a flexible material shaped in a form, for example, of the outline of a person's arm and hand may be connected to one of the passageways 3011a-d or 3012a and b using an appropriate insert 400 and insert connector 3006a-d. In a completed glove-box in accordance with an embodiment of the invention, like the one shov.TI in FIG. 1A, the glove allows an operator to contact material within the glove-box or otherwise use any tool or accessory placed within the glove box or made a part of a glove. The appropriate insert 400, insert connector 3006a forms a class 3 glove "port" for connecting a glove to the tank 3000.

Completing the major subcomponents of the tank 3000 are a bottom plate 3010 that is attached to the bottom edges of backplates 3008a and d, and side plates 3007a and b, and top plate 3009 that is attached to the top edges of backplates 3008a and d and side plates 3007a and b.

In one embodiment of the invention, the subcomponents 3006a through 3011d of the tank 3000 shown in FIG. 2 may be independently machined from a plastic, such as a high density polyurethane (HDPE, density of 0.95), or an acrylic (e.g. plexiglas) or a polycarbonate (e.g. LEXAN) and then welded or otherwise connected together to form the tank 3000. Welding of the subcomponents allows for some dimensions (such as height and depth of the tank) to be easily modified by merely welding additional wall sections in place. Because glove boxes made in accordance with the present invention use rigid, highly compressive, high tensile and shear strength materials (HDPE plastics) with low densities (e.g., 0.95) when compared with the densities of prior art glove boxes made from stainless steel (density 7.75), such glove boxes are both lightweight, shock resistant, and pressure resistant (i.e., rugged). In experiments, a glove box system made in accordance with the present invention was dropped from a height of approximately six feet yet still maintained its shape and class 3 operating capability.

When assembled as shown in FIG. 1A glove boxes provided by the present invention (such as glove box 1 in FIG. 1A) meet all Class 3 requirements.

Though made of rugged material, the glove boxes 1,100 are lightweight enough to be carried by a single individual. One exemplary embodiment was found to weigh about 43.5 pounds, this weight including components such as filters, attachment hardware and an interior light. Obviously, other embodiments will exhibit different weights depending on factors such as dimensions of the tank, properties of the filters, and the like. Table 1 below provides exemplary weights for components of glove boxes in accordance with the present invention:

TABLE I

| Item: | Weight: |
| --- | --- |
| 1008 Light | 0.65 |
| Blank Power Plate | 0.55 |
| Cords | 1.30 |
| Dunk Tank | 4.85 |
| Dunk Tank Lid | 0.55 |
| Electric Cartridge w/Gasket | 2.30 |
| Filter Hold Exhaust | 2.75 |

TABLE I-continued

| Item: | Weight: |
|---|---|
| Filter Hold Intake | 2.10 |
| Filter Lock | 0.65 |
| Filter Lock | 0.65 |
| Filter Lock | 0.65 |
| Filter Plate | 0.35 |
| Filter Plate | 0.35 |
| Flat Top | 7.95 |
| Gloves | 0.45 |
| Hand Tools | 0.10 |
| Hard Top | 11.70 |
| HEPA 1 | 0.45 |
| HEPA 2 | 0.90 |
| HEPA 2 | 0.90 |
| Misc Screws W/Case | 1.20 |
| PCU | 11.70 |
| Plug A | 0.35 |
| Plug A | 0.35 |
| Plug BC Assembly | 0.65 |
| Plug BC Assembly | 0.65 |
| Pre Filter | 0.20 |
| Tank W/Gaskets | 18.65 |
| Top Fasteners | 0.75 |
| Total | 74.00 |

In alternative embodiments of the invention the side plates 3007a and b and/or backplates 3008a and b may be shortened or lengthened as needed to increase, decrease or change the dimensions and/or volume of the tank 3000. The use of specific design software allows for the dimensions of all components to be automatically changed, as necessary, when the dimensions of any of these plates (or other elements) are modified, without the need to re-engineer or re-design the complete glove box. The tanks provided by the present invention, including tank 3000, are also modular in nature meaning that each subcomponent 3006a through 3011d may be modified in shape, form, and sometimes even function yet may still be combined into an integral tank 3000. The modularity allows for different subcomponents to be "swapped out" in the field during use of the glovebox.

In accordance with the present invention, the subcomponents 3006a through 3011d (as well as others making up the inventive glove boxes) are rugged and designed to maintain their geometric shapes even when subjected to vibrations and shock because they are made from material that has a high modulus of elasticity (e.g., HDPE density is 0.95).

Though not shown in Figure each of the insert connectors 3006a-d may be fitted with a suitable gasket or gaskets to ensure a leak-free connection when the insert connectors are made a part of the tank 3000.

Referring now to FIG. 3 there is shown an exemplary "blank" insert connector 3006e according to an embodiment of the invention. The blank insert connector 3006e may be used when a particular passageway 3011a-d or 3012a/b is not needed (e.g., there is no need to connect a section 400 to a passageway). In accordance with an embodiment of the invention the blank insert connector 3006e may comprise a pair of plates 30 3016 and associated pairs of O-rings. Each of the plates is formed with D-ring grooves that form threads for screwing or otherwise turning the completed insert 3006e while inserting it into a passageway. In an embodiment of the invention, the plates 3015, 3016 may be bolted together or otherwise joined using any number of alternatives to form the integral insert 3006e. A lip 3018a and 3018b is formed on each plate 3015, 3016. In an embodiment of the invention the lips 3018a, 3018b are conical in shape but may take the form of other shapes as needed to perform the function of helping to form an airtight connection when the insert 3006e is placed or otherwise inserted into a passageway. The air tight connection is assured due to the use of the four O-rings 3013a, 3013b, 3014a, 3014b and lips 3018a and 3018b. Each of the O-rings and lip function as a separate independent barrier to the flow of air.

It should be noted that the dimensions shown in FIG. 3 are merely illustrative, nominal dimensions. In additional embodiments of the invention blanks with different dimensions may be used to achieve the same function (e.g., as a seal) depending on the application/design criteria.

Figure 4A:
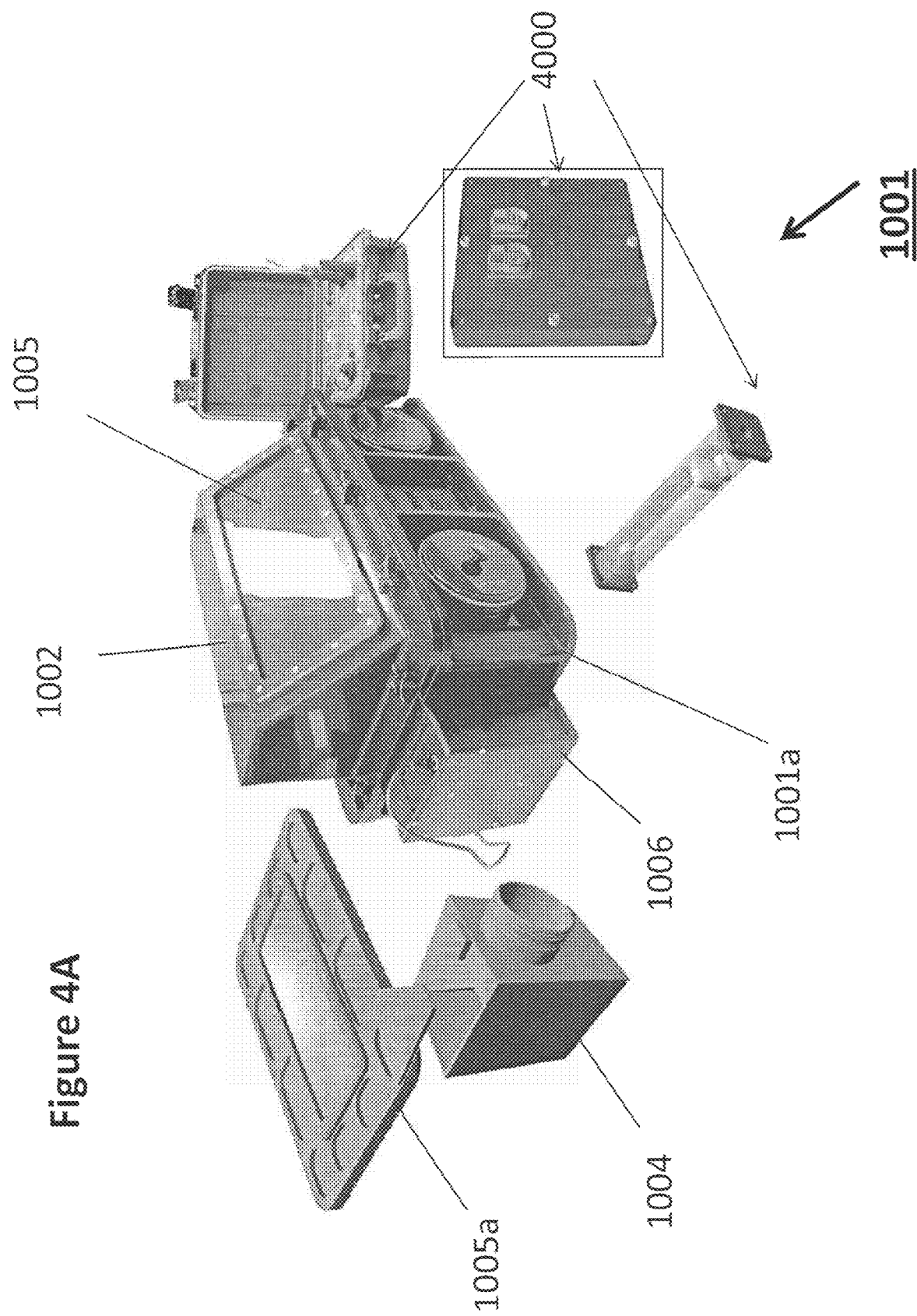
FIG. 4A depicts an exemplary embodiment of a system for providing protection against harmful materials, including an exemplary glove box in accordance with the present invention.

Referring now to FIG. 4A, there is shown a system 1001 for providing protection against harmful materials. As shown the system 1001 comprises an exemplary glove box 1001a that includes a raised top 1002 with "see through" surface 1005, exemplary insert section 1004, exemplary filtering section 1006 and an exemplary power control subsystem 4000. Also shown is an alternative flat top 1005a.

Figure 4B:
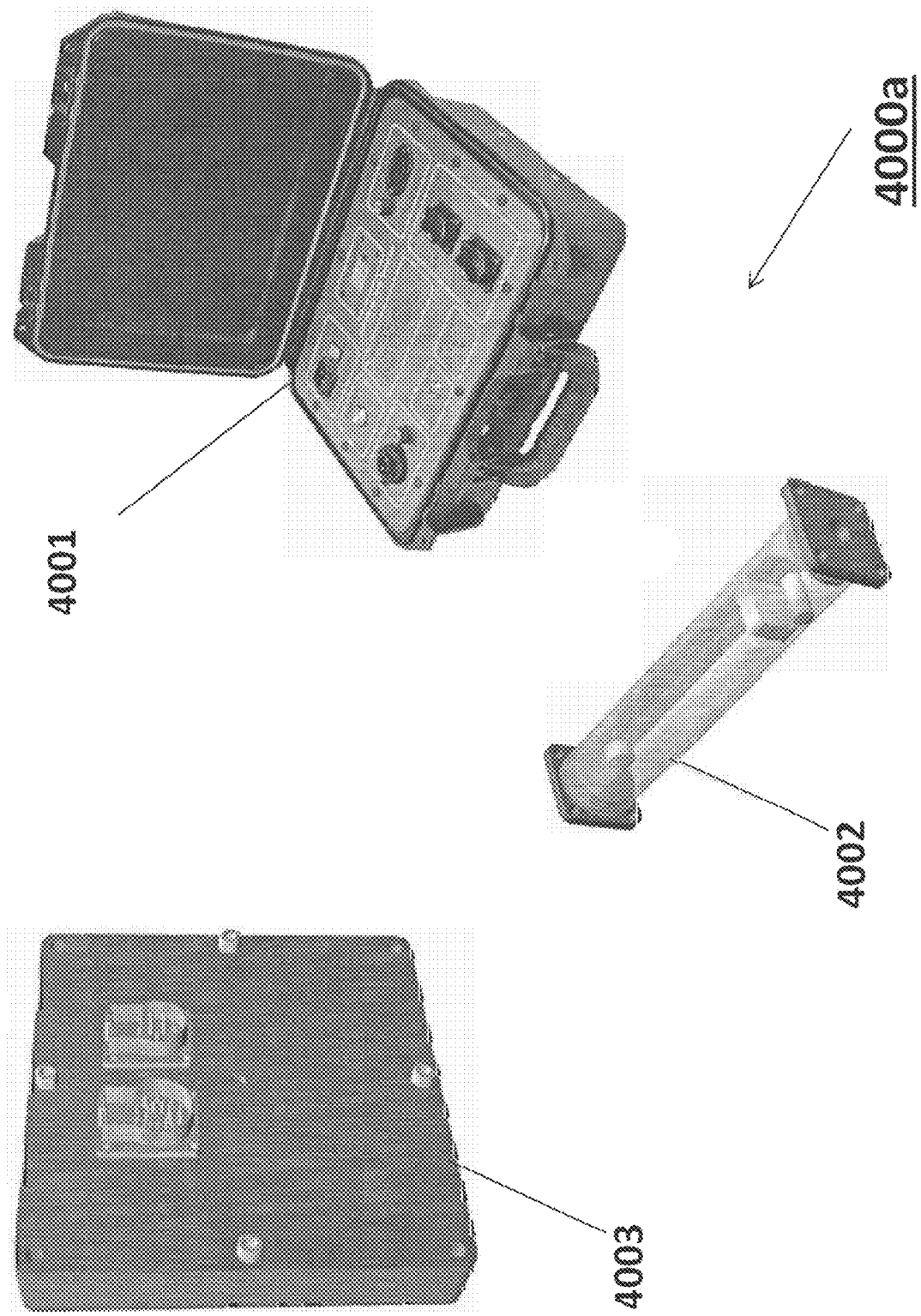
FIG. 4B depicts an exemplary embodiment of power, signaling and control units used with a system for providing protection against harmful materials in accordance with the present invention.

Referring now to FIG. 4B there is shown another exemplary embodiment of a power control subsystem 4000a in accordance with the present invention. As shown, the subsystem 4000a comprises a power and control unit 4001, power and signaling cartridge 4003 and optional multi-level, bi-color LED light source 4002.

Figure 4C:
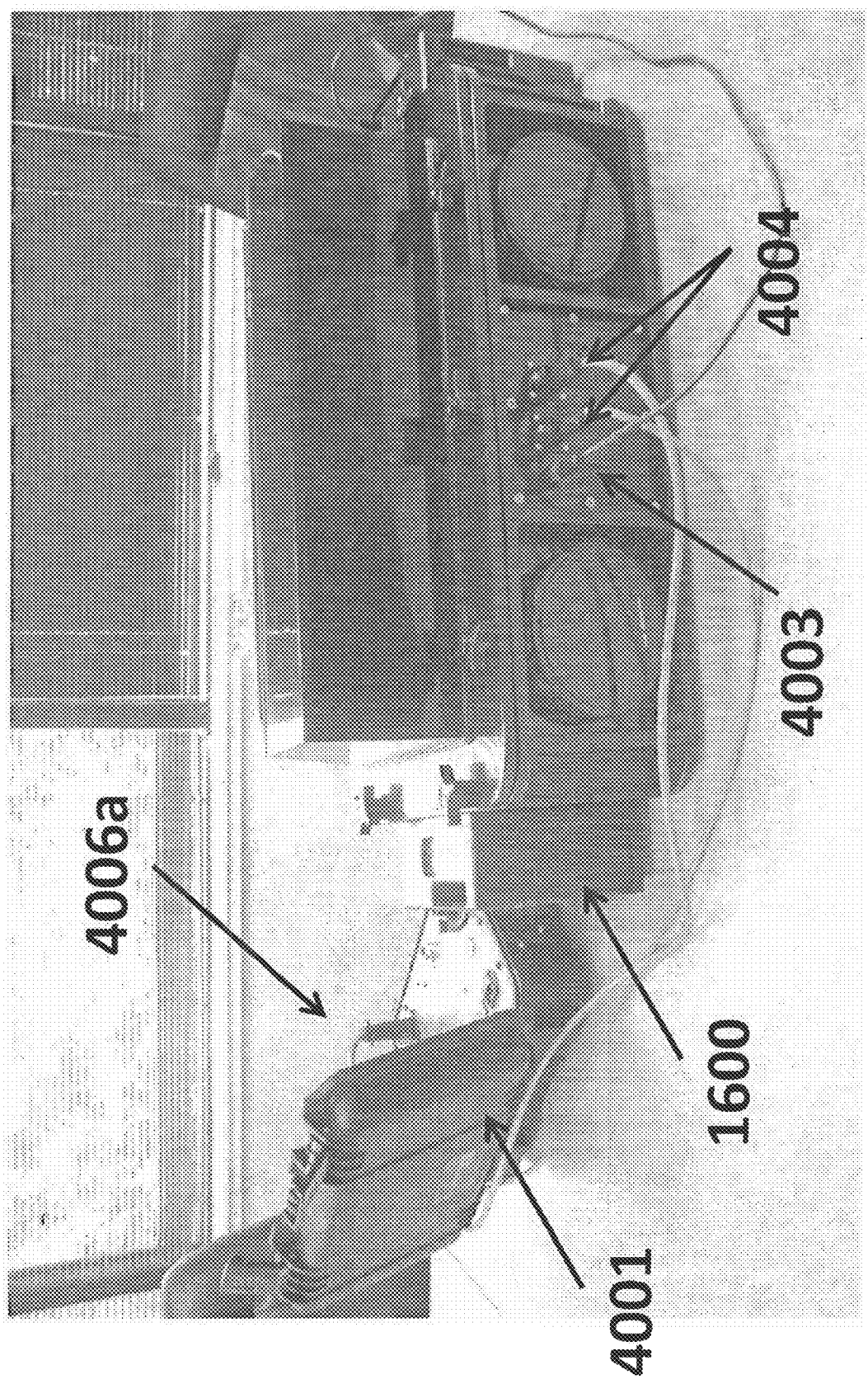
FIG. 4C depicts an exemplary embodiment of a power and signaling cartridge installed in a glove box and connected to a power and control unit in accordance with an embodiment of the present invention.

FIG. 4C depicts an exemplary embodiment of a power and signaling cartridge 4003 shown installed in a glove box and connected to a power and control unit 4001 using suitable connecting cables 4004 and connector 4006a, for example, in accordance with an embodiment of the present invention.

Figure 4D:
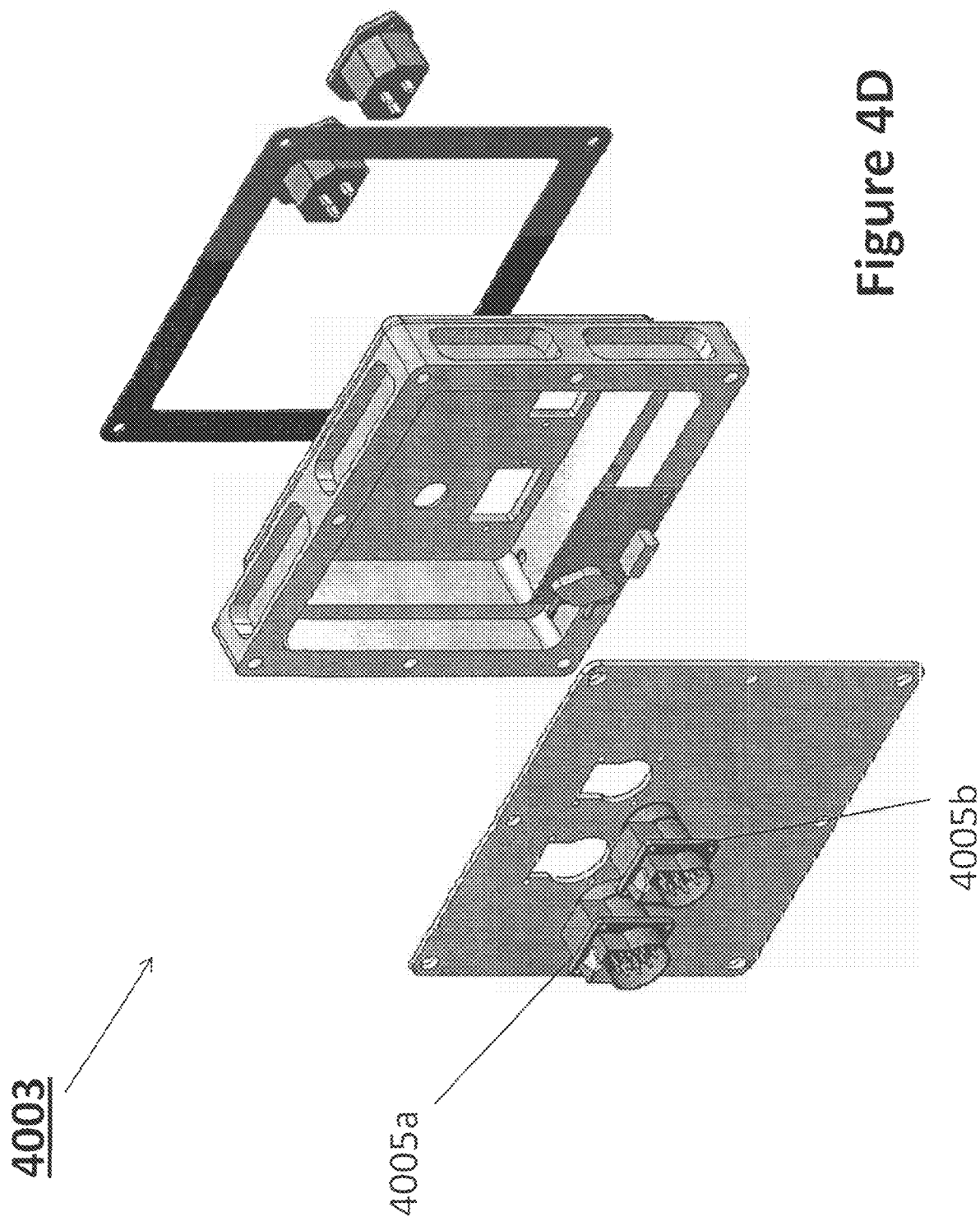
FIG. 4D depicts a simplified exploded view of a power and signaling cartridge in accordance with an embodiment of the present invention.

FIG. 4D depicts a simplified exploded view of a power and signaling cartridge 4003 in accordance with an embodiment of the present invention. As shown the cartridge includes connectors 4005a and b that mate with cables 4004 (shown in FIG. 4C} to connect the cartridge to the control unit 4001 in accordance with an embodiment of the invention.

Figure 4E:
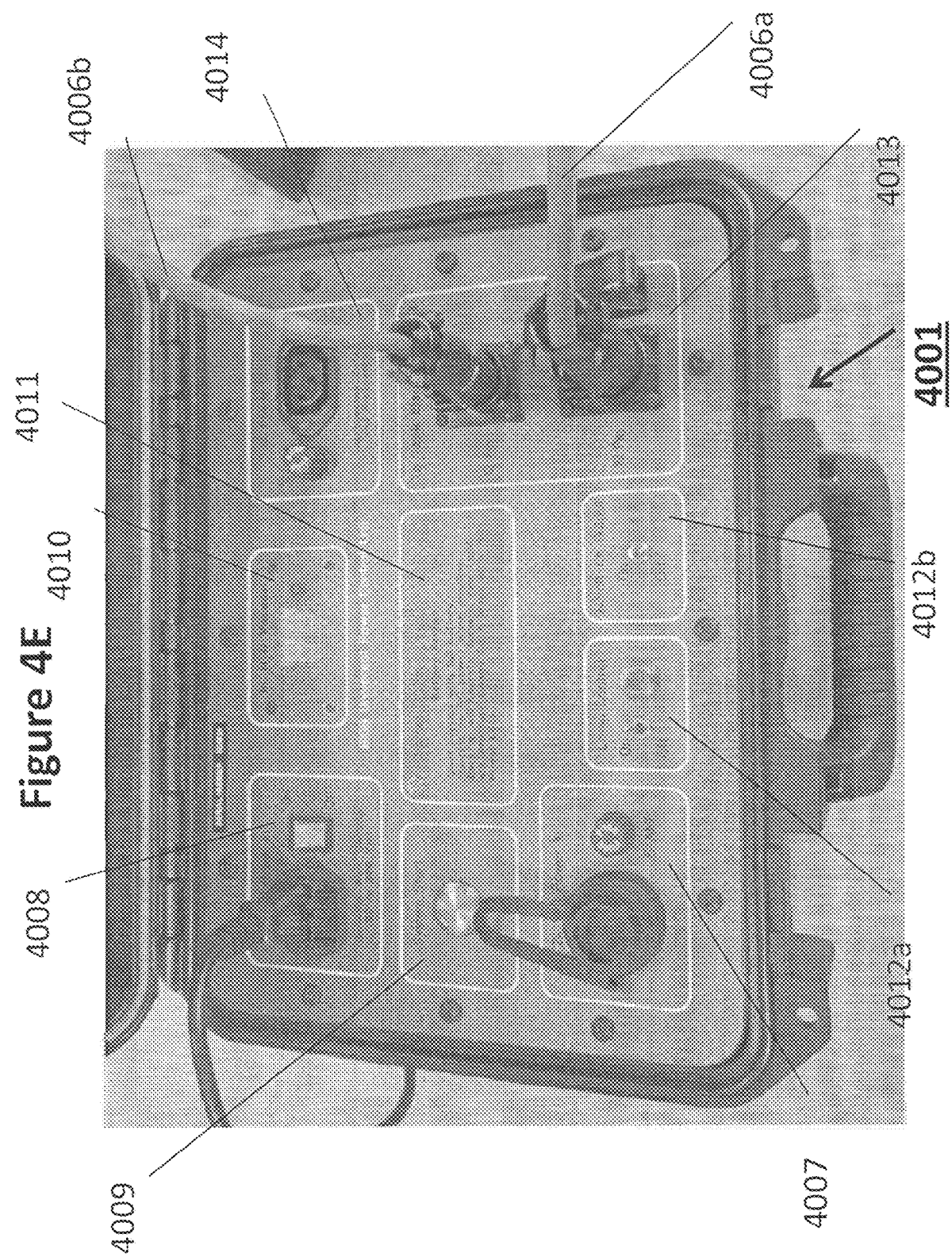
FIG. 4E depicts an exemplary embodiment of a power and control unit in accordance with an embodiment of the present invention.

FIG. 4E depicts an exemplary embodiment of a power and control unit 4001 in accordance with an embodiment of the present invention. As shown the unit may include: a first input power supply section 4007 for inputting, for example, power at 24 volts; a second power supply section 4008 for inputting a wide range of regulated voltages (e.g., 90 to 260 volts); and a system start section 4009. Together sections 4007 through 4009 may comprise a power supply section of the unit 4001.

Unit 4001 may further comprise an output power section that includes an AC power output section 4014 and output power and signaling section 4013 that may be connected to a power and signaling control section, such as section 4003 (see FIGS. 4C and 4O), using cables 4006a and b to control the air flow and pressure, for example, within a glove box.

In the embodiment of the invention shown in FIG. 4E the unit 4001 additionally includes a negative pressure indicator and alarm section (e.g., display and LED) 4010 and other indicator sections 4012a, b. Still further the unit 4001 may include a battery backup capability 4011 that may provide power to a glove box in the event that no power is received at sections 4007, 4008. Unit 4001 functions can allow the user to conduct easily and safely a thorough self certification test just before he starts the actual use of the box. This test allows the verification that the main components of the box are operating properly and that he will be shielded from dangerous materials during operation. A pressure decay test and an operating test can be conducted in less than 6 minutes even when system is not connected to outside power supply It should be understood that the sections making up unit 4001 shown in FIG. 4E are exemplary and other, analogous sections may be substituted for those shown as needed to support a particular, inventive glove box.

Besides being light weight and modular, the glove boxes provided by the present invention are simple to maintain and decontaminate. For example, a glove box like that shown in FIG. 1A may be completely disassembled (and reassembled) with 2 hexagonal wrenches. Further, its unique modular design using rugged components allows for visual verification that each insert or other attached accessory has been securely inserted or otherwise connected to the glove box assuring its safe operation. In tests completed by the inventor, exemplary filters may be exchanged (e.g., to substitute a biological filter for a chemical one) in less than 5 minutes, a top may be replaced in less than 3 minutes, a power and control system may be connected in less than 2 minutes while a tank may be replaced in less than 2 minutes.

Because the components and subcomponents making up inventive glove box systems in accordance with the present invention (e.g., tank, top) can be made by, for example, welding separate plastic surfaces the size, volume and dimensions of glove box systems provided by the present invention maybe easily modified. For example, the height of the vertical walls making up a tank may be increased or decreased.

As explained before, gaskets and gasketing material is used throughout inventive glove box systems. These gaskets and gasketing materials provide for tight and reliable seals as well as compensate for slight dimensional imperfections in the machining of components and/or subcomponents.

Though the description above has set forth some examples in order to illustrate the methods and devices of the present invention, a more complete scope of the present invention is given by the claims that follow.

We claim:

1. A one person, hand carriable, and air tight Class-3 glove box for handling harmful material that does not exceed a weight of 100 pounds, the glove box comprising:
    a top component;
    a tank component comprising a lightweight, rigid plastic and comprising an upper edge removably attached to the top component, a floor and an external vertical wall comprising a plurality of passageways for removable connection to other components, with unused passageways covered to maintain the airtight integrity of the Class 3 glove box and a gasketing material disposed between the upper edge of the tank component and the top component,
    said top component and tank component configured to maintain a negative pressure;
    at least one HEPA filter removably attached to one of the passageways for filtering air associated with the Class 3 glove box, and an exhaust HEPA filter removably attached to an exhaust opening; and
    an input/output component removably attached to one of the passageways for introducing the harmful material to, or extracting such harmful material from, the glove box,
    wherein the Class-3 glove box is one person, hand-carriable and wherein the top component, tank component, HEPA filters and input/output component are configured as the one person, hand carriable, and air tight Class-3 glove box for handling the harmful material that does not exceed a weight of 100 pounds.

2. The glove box as in claim 1 wherein the weight of the glove box does not exceed 75 pounds.

3. The glove box of claim 1 wherein the top component includes a "see through" portion allowing a user to view the harmful material within the glove box.

4. The glove box of claim 3 wherein the "see through" material comprises a material selected from the group consisting of: glass, plexiglass and polycarbonate.

5. The glove box of claim 1 wherein the top component comprises a five-sided, rigid plastic component.

6. The glove box of claim 1 further comprising at least one pre-filter element component.

7. The glove box as in claim 6 wherein the pre-filter element component comprises an intake filter and the at least one HEPA filter element is disposed adjacent to the passageway in the tank vertical sidewall.

8. The glove box of claim 1 wherein the vertical wall of the tank component further comprises a plurality of vertical, welded walls, floor welds and upper and lower edge welds.

9. The glove box of claim 1 wherein the vertical wall further comprises rigid, external vertical ribs.

10. The glove box as in claim 1, further comprising one or more blank connectors for covering the unused passageways to maintain the airtight integrity of the glove box.

11. The glove box of claim 1 wherein the tank component comprises a molded plastic material.

12. The glove box of claim 1, the glove box configured such that when the dimensions of one component are modified, the dimensions of remaining components change to maintain the airtight integrity of the glove box.

13. The glove box of claim 1 wherein the tank component comprises a plastic material selected from the group consisting of: high density polyurethane, an acrylic, and a polycarbonate.

14. The glove box as in claim 1 comprising an insert configured as a pair of lipped plates and O-rings covering all unused passageways.

15. The glove box as in claim 1 wherein the gasketing material comprises an elastic polymer or an ethylene propylene diene monomer.

* * * * *